July 19, 1932. J. E. HAERINGER 1,868,287
ELECTRIC BREAD TOASTER
Filed May 17, 1930 4 Sheets-Sheet 1

Inventor
Jacques E. Haeringer
By
Attorney

July 19, 1932.  J. E. HAERINGER  1,868,287
ELECTRIC BREAD TOASTER
Filed May 17, 1930  4 Sheets-Sheet 2

Inventor
Jacques E. Haeringer
By
Attorney

July 19, 1932.   J. E. HAERINGER   1,868,287
ELECTRIC BREAD TOASTER
Filed May 17, 1930   4 Sheets-Sheet 3

Inventor
Jacques E. Haeringer
By
Attorney

July 19, 1932. J. E. HAERINGER 1,868,287
ELECTRIC BREAD TOASTER
Filed May 17, 1930 4 Sheets-Sheet 4
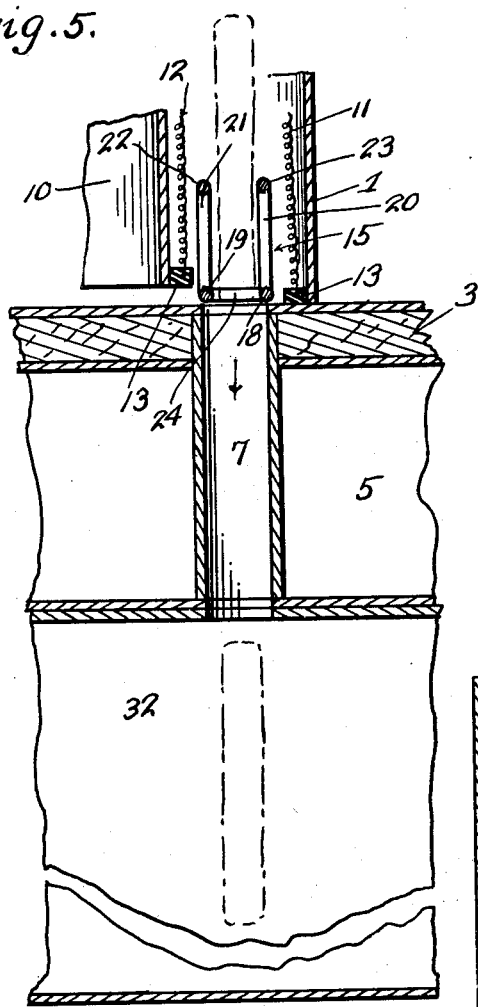
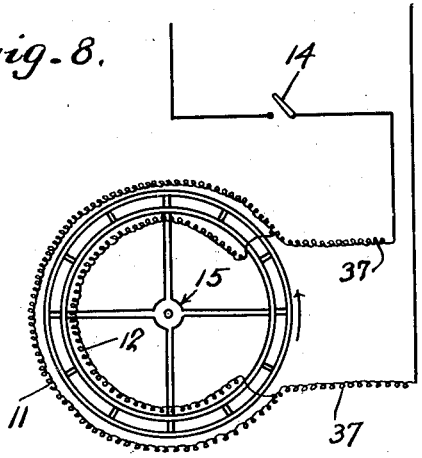
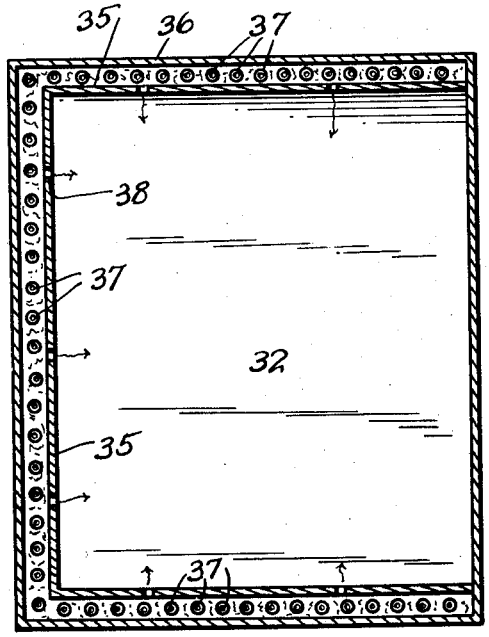
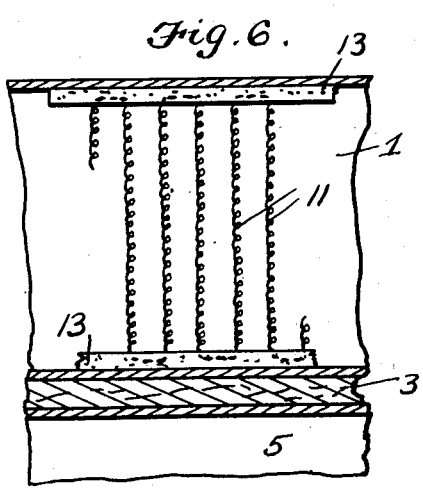
Inventor
Jacques E. Haeringer
By
Attorney Patented July 19, 1932

1,868,287

UNITED STATES PATENT OFFICE

JACQUES EDWARD HAERINGER, OF WASHINGTON, DISTRICT OF COLUMBIA

ELECTRIC BREAD TOASTER

Application filed May 17, 1930. Serial No. 453,368.

The present invention relates to improvements in electric bread toasters and has for its principal object to provide a toaster for toasting large quantities of bread.

The primary object of the present invention is to provide an automatic bread toaster that will accommodate a number of slices of bread at one time, means being provided for toasting both sides of the pieces of bread at the same time.

A further object is to provide a bread toaster wherein the same includes a rotatable carrier operable between electric heating elements, the carrier being of such construction as to accommodate a number of slices of bread at one time, a receptacle being in association with the casing housing the rotatable carrier and the heating elements for receiving the toasted slices of bread that are automatically discharged from the toasting mechanism.

A further object is to provide a bread toaster of the above mentioned character wherein a storage chamber for the slices of bread to be toasted is arranged above the toasting mechanism thus providing a compact structure that will not occupy much space and which will furthermore at all times be positive and efficient as well as automatic in carrying out the purposes for which it is designed.

Another object is to provide a bread toaster of the above mentioned character which is particularly useful in places where it is necessary to toast large quantities of bread, it being absolutely impossible for the toast to be burnt which is one of the chief objections with the types of electric toasters now universally in use.

Another object is to provide a bread toaster of the above mentioned character which is simple in construction, inexpensive, strong and durable.

Other objects and advantages of the present invention will become apparent from the following description when taken in connection with the accompanying drawings.

In the accompanying drawings wherein like reference characters indicate corresponding parts throughout the several views:

Figure 5 is a detail sectional view taken substantially on the line 5—5 of Figure 3.

Figure 6 is a detail view of the electric heating element.

Figure 7 is a sectional view through the bread receptacle taken on the line 7—7 of Figure 2, looking downwardly.

Figure 8 is a diagrammatic view of the wiring for the electric heating means.

Figures 1, 10:
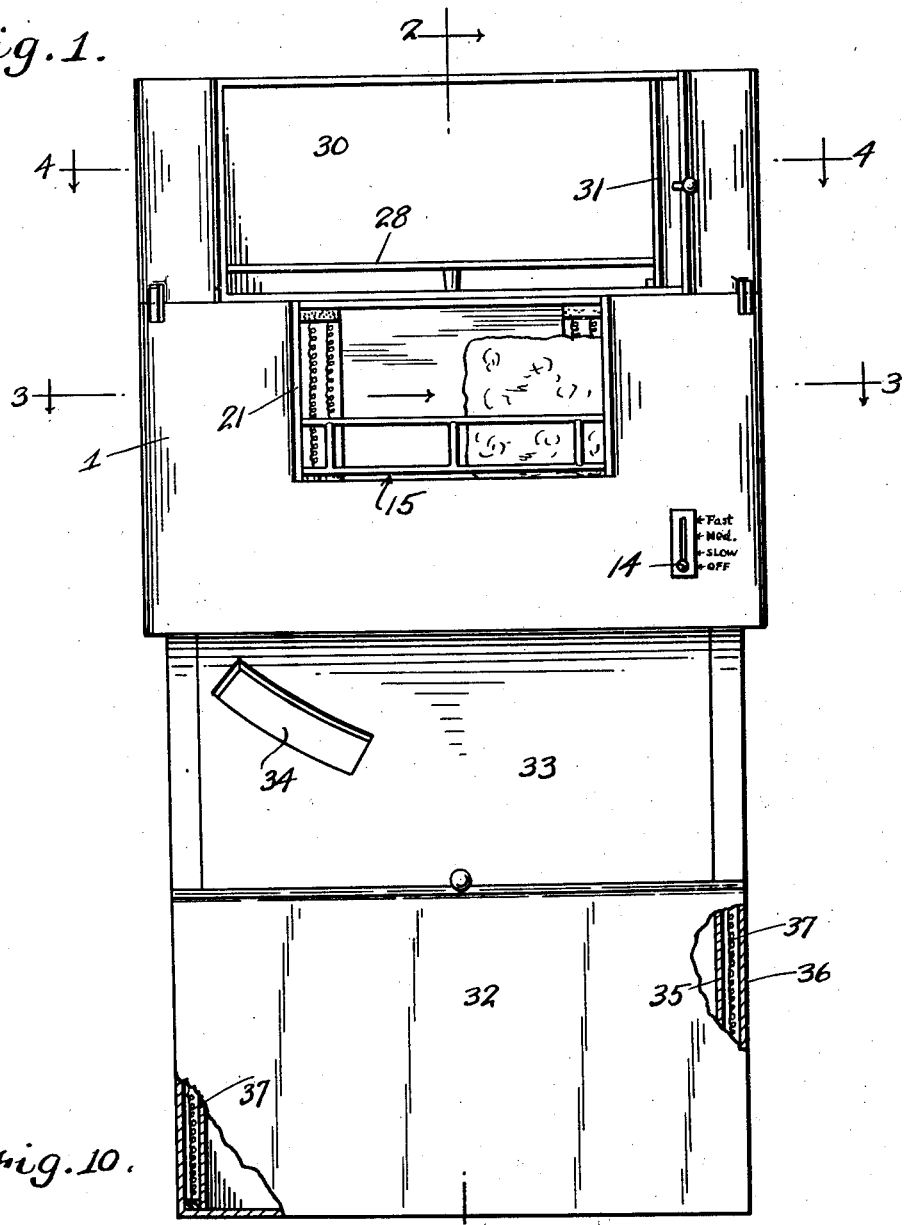
Figure 1 is a front elevation of the bread toaster embodying my invention.
Figure 10 is a detail elevational view of the carrier showing a piece of toast in the act of being discharged therefrom into the heated bread receptacle.

In the drawings wherein for the purpose of illustration is shown the preferred embodiment of my invention, the numeral 1 designates a substantially cylindrical casing that is formed with an opening 2 in the front side thereof. An insulated false bottom 3 is arranged in the casing 1 dividing the casing into an upper toasting compartment 4 and a motor receiving chamber 5, access to the bottom chamber being had through an opening provided in the rear side of the casing and which opening is normally closed by means of the door 6.

A vertically disposed passage 7 is formed in the front portion of the casing 1 and this passage extends completely through the bottom compartment 5 and has communication at its top with the toasting compartment 4, the purpose of this passage 7 being hereinafter more fully described.

Figure 2:
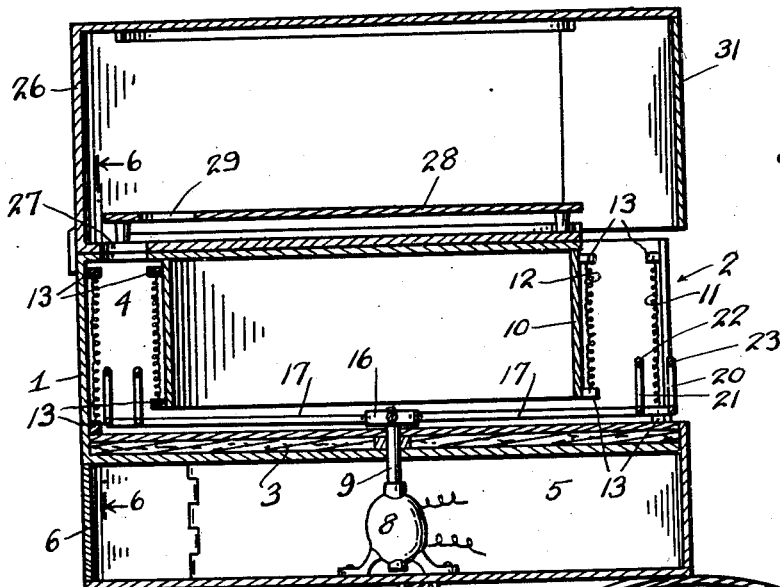
Figure 2 is a vertical sectional view taken approximately on the line 2—2 of Figure 1, looking in the direction of the arrows.

An electric motor 8 of the conventional construction is mounted vertically within the bottom compartment 5 and the drive shaft 9 of this motor extends upwardly through the false bottom 3 into the central portion of the toasting compartment 4 as is shown very clearly in Figure 2.

Figure 3:
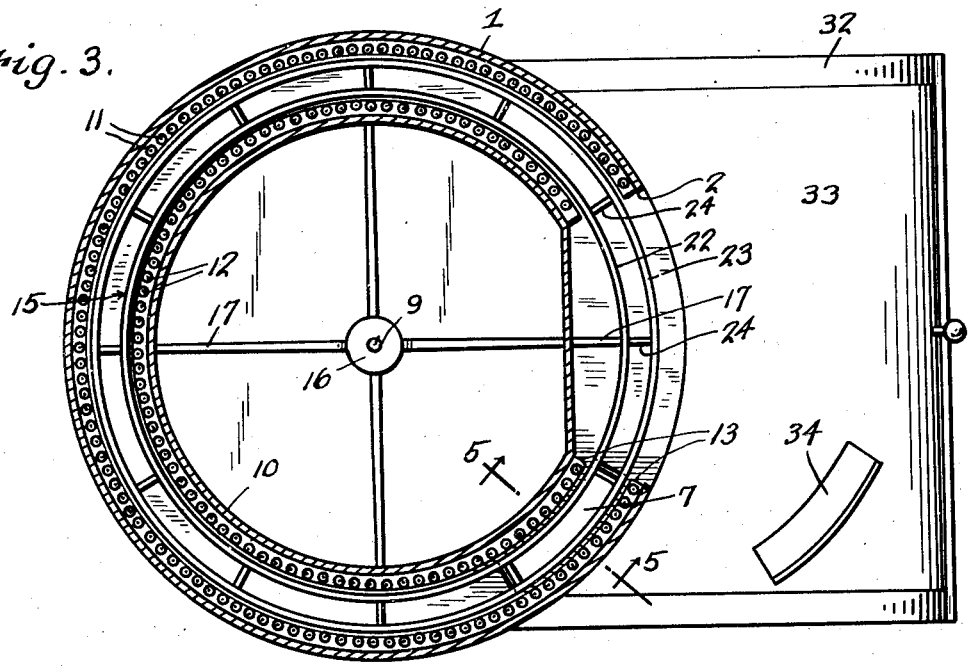
Figure 3 is a horizontal section taken substantially on the line 3—3 of Figure 1, looking downwardly.
Figure 4:
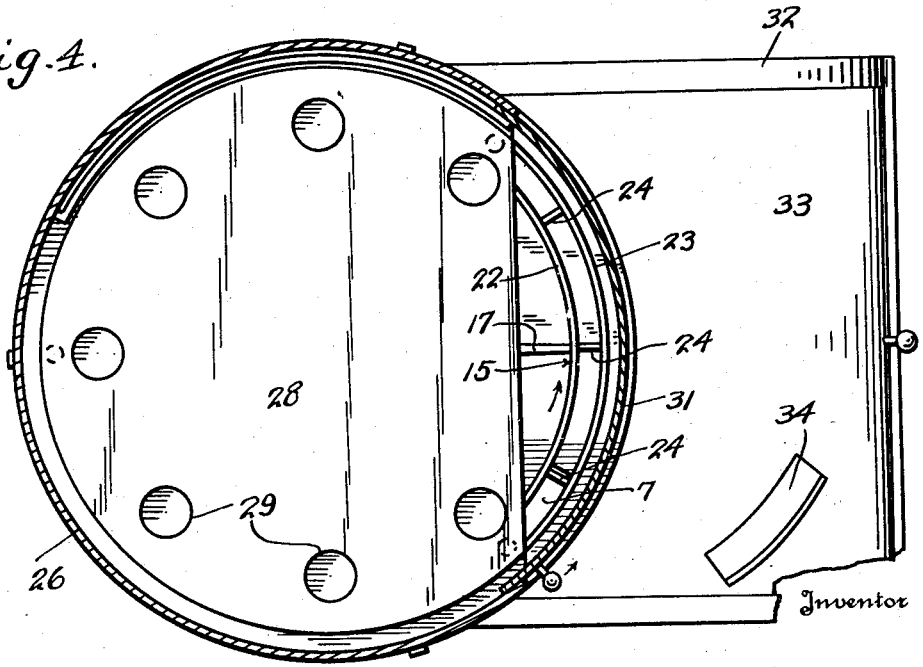
Figure 4 is a similar view taken on the line 4—4 of the same figure also looking downwardly.

Extending downwardly from the top of the casing 1 in the toasting compartment 4 is the circular ring 10, the lower edge thereof being spaced with respect to the bottom of the toasting compartment and the periphery of this ring is also spaced with reference to the peripheral face of the casing 1 as is also clearly shown in Figure 2 of the drawings, as well as in Figure 3. The front side of the ring 10 directly opposite the opening 2 is substantially straight as indicated very clearly in Figure 3. Electric heating elements 11 and 12 are arranged vertically on the inner opposed faces of the periphery of the casing 1 and the depending ring 10, the heating elements being arranged vertically in spaced relation with respect to each other and suitable insulating strips 13 are arranged at the top and bottom portions in the toasting compartment for cooperation with the resistance wires as indicated more clearly in Figure 6. Current is supplied to the electric heating elements from any suitable source and a heat regulating switch 14, electrically connected with the heating elements, is mounted on the casing 1 in suitable place.

Figure 9:
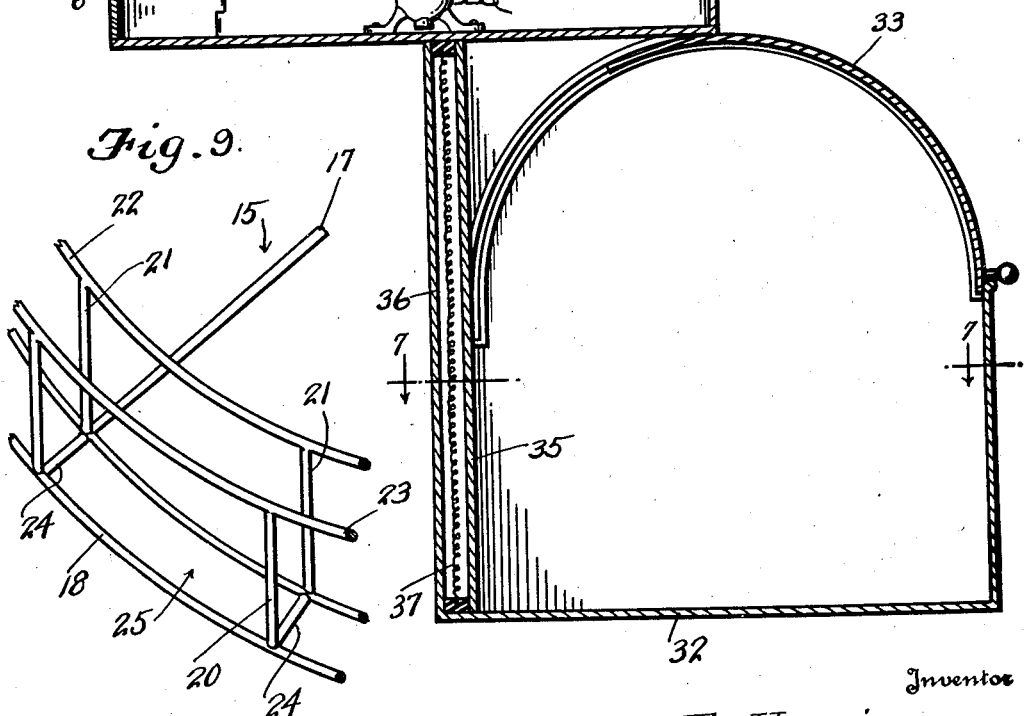
Figure 9 is a fragmentary detail perspective view of the rotatable carrier forming a salient part of the present invention.

Forming a salient part of the present invention is the rotatable bread carrier denoted generally by the numeral 15 that is operable within the toasting compartment 4 and this carrier includes a hub 16 that is secured on the upper end of the drive shaft 9 of the motor 8 for rotation therewith, a series of arms 17 extending radially from the hub between the lower edge of the ring 10 and the bottom of the toasting compartment. A pair of concentric rings 18 and 19 are secured around the outer ends of the radially extending arms 17, these rings being disposed in spaced relation with respect to each other and extending upwardly from the rings 18 and 19 are the posts 20 and 21, respectively. A ring 22 is carried by the upper ends of the innermost posts 21, a similar ring 23 being carried by the uppermost ends of the outer posts 20 as shown in detail in Figure 9 of the drawings and cross rods 24 interconnect the lower concentric rings 18 and 19 at spaced intervals to provide independent compartments 25 for the reception of the slices of bread that are placed in the toasting compartment through the opening 2. It is, of course, to be understood that the lower edges of the slices of bread will rest on the bottom of the toasting compartment and as is clearly shown in the drawings, the concentric rings and the upstanding posts that cooperate so as to provide the bread receiving compartments are operable between the opposed electric heating elements so that both sides of the pieces of bread will be toasted simultaneously when the switch 14 is turned on.

The compartments 25 will successively move over the passage 7 during the rotation of the carrier unit 15 as will be presently described.

Removably supported on the top of the casing 1 is a similar shaped storage chamber 26, the bottom of this chamber being provided with openings that register with similar openings formed in the top of the casing 1 as shown at 27 in Figure 2 of the drawings and removably positioned within the storage chamber 26 is a tray 28 that is also formed with spaced openings 29. The front of the storage chamber 26 is provided with an opening 30 so that slices of bread to be toasted may be initially placed in the storage chamber on the tray 28 and a sliding door 31 provides a closure for the opening 30. The provision of the openings 27 and 29 will permit heat from the toasting chamber to pass upwardly into the storage chamber 26 to partially heat the slices of bread placed in the storage chamber.

Also forming a salient part of the present invention is the bread receptacle 32 that is secured to the bottom of the front portion of the casing 1, the top of this bread receptacle being rounded and open and a sliding cover 33 is provided for the open top of the bread receptacle. This sliding cover 33 is provided with an arcuate tapered opening 34 so that when the cover is in its raised rearwardmost position, the opening 34 will communicate with the passage 7 so that the toasted slices of bread will be discharged into the bread receptacle 32.

Attention is now directed to Figure 7 of the drawings wherein there is clearly illustrated the construction of the bread receptacle with reference to the sides thereof. It will be observed that the opposed end walls and rear sides of the bread receptacle include inner and outer walls denoted by the numerals 35 and 36, respectively, the walls being spaced from each other and arranged between the spaced walls are electric heating elements 37, suitable insulating material being arranged in the space between the walls 35 and 36. It will also be observed that the inner walls 35 are formed with heat emitting openings 38 so that the toasted slices of bread discharged into the receptacle 32 will be kept in a heated condition until removed from the receptacle for use.

The operation of my improved toaster is thought to be readily obvious from the construction disclosed and it will be readily apparent that when the motor is in operation, the carrier 15 will rotate and as the bread compartments pass the opening 2 in the direction of the arrow in Figure 1, a slice of bread is placed in each bread compartment and when the bread compartments have rotated approximately one complete revolution, both sides of the piece of bread in each compartment will be properly toasted and the toasted slice of bread will automatically drop through the passage 7 through the open top receptacle 32 into the latter. In this manner, it will be absolutely impossible for the slices of toast to be burnt and as the bread compartments 25 become emptied, they may be refilled with fresh slices of bread that are to be toasted. In this manner, a large quantity of slices of bread may be toasted at one time thus saving considerable time and labor.

A toaster of the above mentioned character is particularly useful in hotels, lunch rooms, restaurants where it becomes necessary to toast large quantities of bread and my toaster will at all times be positive and efficient as well as automatic in its operation.

While I have shown the preferred embodiment of the invention, it is to be understood that minor changes in the size, shape and arrangement of parts may be resorted to without departing from the spirit of the invention and the scope of the appended claims.

Having thus described the invention what I claim is:

1. An electric toaster comprising in combination, a toating compartment, a bread receptacle positioned below the toasting compartment and having communication therewith through an opening provided in the bottom of the toasting compartment, spaced concentrically arranged electric heating elements arranged within the toasting compartment providing an annular toasting chamber therebetween, and a rotatable carrier for receiving slices of bread operable within the toasting chamber between electric heating elements, the toasted slices of bread being automatically discharged from the toasting compartment into the bread receptacle through said opening.

2. An electric toaster comprising in combination, a toasting compartment, a bread receptacle positioned below the toasting compartment and having communication therewith through an opening provided in the bottom of the toasting compartment, spaced concentrically arranged electric heating elements arranged within the toasting compartment, providing an annular toasting chamber therebetween, a rotatable carrier for receiving slices of bread operable within the toasting chamber between the electric heating elements, the toasted slices of bread being automatically discharged from the toasting compartment into the bread receptacle through said opening, and an electric heating element associated with the receptacle for keeping the toasted bread warm.

3. An electric toaster comprising in combination a toasting compartment, a bread receptacle positioned below the toasting compartment and having communication therewith through an opening provided in the bottom of the toasting compartment, spaced concentrically arranged electric heating elements arranged within the toasting compartment providing an annular toasting chamber therebetween, a rotatable carrier for receiving slices of bread operable within the toasting chamber between the electric heating elements, the toasted slices of bread being automatically discharged from the toasting compartment into the bread receptacle through said opening, and a storage chamber for the bread to be toasted mounted above the toasting compartment, said chamber and the toasting compartment being provided with communicating heat passages.

4. An electric toaster comprising in combination, a casing having a discharge opening in the bottom thereof, concentrically spaced electric heating units mounted within the casing and providing an annular toasting chamber therebetween, a rotatable carrier for receiving slices of bread operable within the toasting chamber between the electric heating elements, the toasted slices of bread being automatically discharged from the carrier through said opening successively as the slices of toasted bread pass over the opening in the casing, said carrier including concentrically spaced rings interconnected at spaced intervals to provide independent bread receiving compartments, additional concentrically spaced rings arranged above the respective aforementioned rings and being connected thereto.

5. An electric toaster comprising in combination, a circular casing, a false bottom arranged in the casing dividing the same into an upper and lower compartment, a ring-like member depending from the top of the upper compartment and terminating in spaced relation with respect to the false bottom and being spaced from the side walls of the upper compartment to provide an annular toasting chamber, electric heating elements arranged on the opposed sides of the toasting chamber, a motor arranged vertically in the lower compartment, the drive shaft of the motor extending through the false bottom into the upper chamber, a hub secured on the upper end of the drive shaft, arms extending radially therefrom below the depending ring, concentrically spaced rings carried by the outer ends of the radial arms for operation within the toasting chamber between the electric heating elements, the slices of bread to be toasted being positioned between the concentrically spaced rings, an open top bread receptacle supported below the bottom of the casing, said casing being provided with a vertical passage affording communication between the toasting chamber and the bread receptacle whereby the toasted slices of bread will be automatically discharged into the bread receptacle one by one as the slices of bread pass over the passage.

In testimony whereof I affix my signature.

JACQUES E. HAERINGER.